United States Patent [19]

Landeck

[11] Patent Number: 4,903,559
[45] Date of Patent: Feb. 27, 1990

[54] REPETITIVE ARC CUTTING OF CONTINUOUS SHEETING

[75] Inventor: Harry A. Landeck, Tolland, Conn.

[73] Assignee: First Brands Corporation, Danbury, Conn.

[21] Appl. No.: 99,560

[22] Filed: Sep. 22, 1987

[51] Int. Cl.⁴ .................................................. B26F 3/00
[52] U.S. Cl. ........................................... 83/24; 83/37; 83/53; 83/100; 83/177; 83/428; 83/917; 493/232
[58] Field of Search ............ 83/53, 24, 100, 177, 83/321, 428, 426, 734, 917, 37, 490; 493/232

[56] References Cited

U.S. PATENT DOCUMENTS

| | | |
|---|---|---|
| 1,235,691 | 8/1917 | Jagenberg .......................... 83/428 |
| 2,736,349 | 6/1982 | Francis . |
| 3,066,394 | 12/1962 | Litzka . |
| 3,347,121 | 10/1967 | Wiatt . |
| 3,350,969 | 11/1967 | Wiatt et al. . |
| 3,614,369 | 10/1971 | Medley .......................: 219/10.43 |
| 3,756,106 | 9/1973 | Chadwick et al. ............... 83/177 |
| 3,815,458 | 6/1974 | Jirousek ............................ 83/490 |
| 3,950,189 | 4/1976 | Lange et al. ...................... 83/428 |
| 4,048,885 | 9/1977 | Miyakita et al. .................. 83/53 |
| 4,202,229 | 5/1980 | Feldkämper ...................... 83/327 |
| 4,266,112 | 5/1981 | Niedermeyer .................... 83/428 |
| 4,300,421 | 11/1981 | Yano et al. ....................... 83/100 |
| 4,335,636 | 6/1982 | Porter ............................... 83/177 |
| 4,567,796 | 2/1986 | Kloehn et al. ..................... 83/53 |
| 4,573,382 | 3/1986 | Kloehn et al. ..................... 83/177 |
| 4,624,654 | 11/1986 | Boyd et al. ....................... 493/194 |
| 4,638,701 | 1/1987 | Oberländer ....................... 83/490 |
| 4,664,649 | 5/1987 | Johnson et al. .................. 83/917 |

FOREIGN PATENT DOCUMENTS

| | | | |
|---|---|---|---|
| 2553330 | 4/1985 | France ............................ 83/177 |
| 620386 | 7/1978 | U.S.S.R. ......................... 83/177 |

Primary Examiner—Hien H. Phan
Attorney, Agent, or Firm—Gary L. Warner

[57] ABSTRACT

A process and apparatus for making a repetitive arc cut in a continuous manner in a continuous supply of sheeting possessing edges, which involves providing a moving sheeting across a cutting area and passing through the area an arc-directed omnidirectional cutting means at and across an edge, in the general direction of the sheeting, to puncture a portion of the moving sheeting, maintaining the arc directed velocity of the omnidirectional cutting device at a rate greater than that of the directional velocity of the sheeting such that the puncture is enlarged to a lineal cut. The most favorable application of the invention involves the use of waterjet cutting to cut holes, especially primarily round holes, in multi-wall plastic constructions.

43 Claims, 7 Drawing Sheets

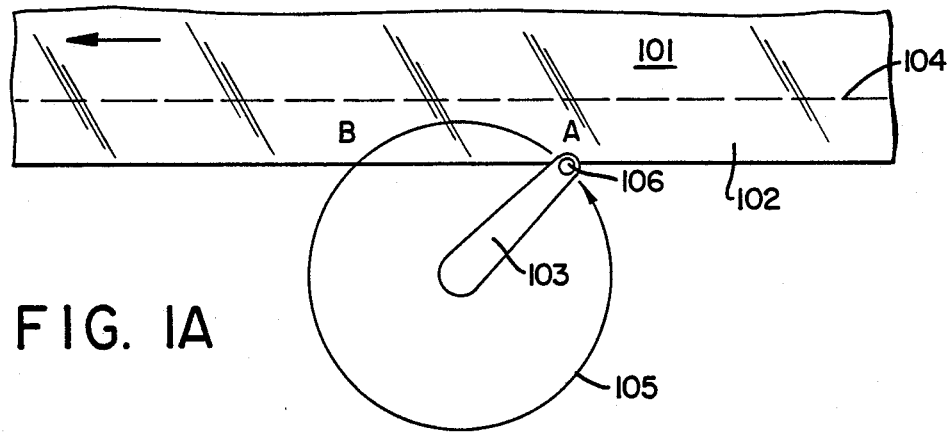
FIG. IA
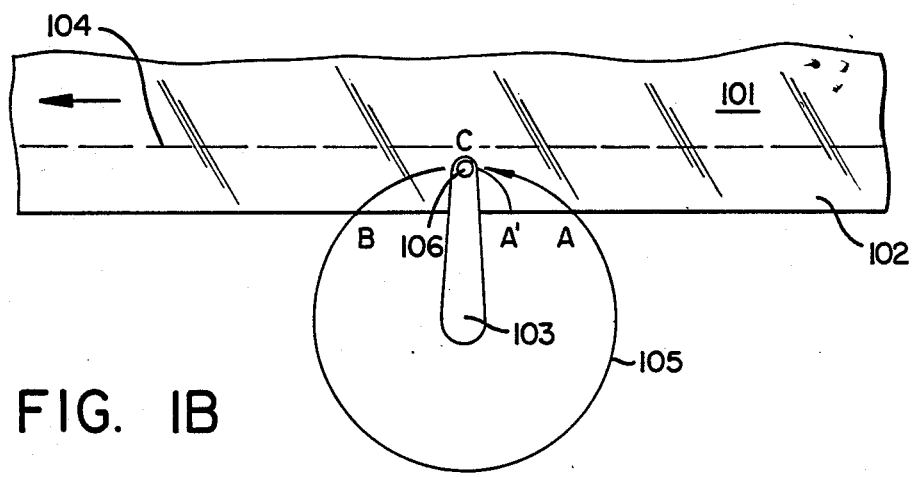
FIG. IB
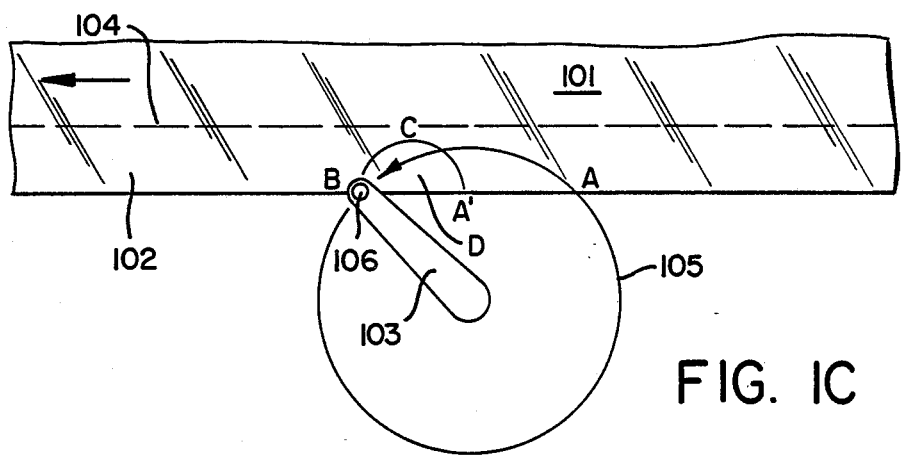
FIG. IC

REPETITIVE ARC CUTTING OF CONTINUOUS SHEETING

RELATED APPLICATIONS

Copending U.S. patent application Ser. No. 099,476, filed Sept. 22, 1987, now abandoned, commonly assigned and copending U.S. patent application Ser. No. 099,911, filed Sept. 22, 1987.

BRIEF DESCRIPTION OF THE INVENTION

The invention relates to a process and apparatus for making a repetitive arc cut in a continuous manner in a continuous supply of sheeting possessing edges, which involves providing a moving sheeting across a cutting area and passing through the area an arc-directed omnidirectional cutting means at and across an edge, in the general direction of the sheeting, to puncture a portion of the moving sheeting, maintaining the arc directed velocity of the omnidirectional cutting means at a rate greater than that of the directional velocity of the sheeting such that the puncture is enlarged to a lineal cut. The most favorable application of the invention involves the use of waterjet cutting to cut holes, especially primarily round holes, in multi-wall plastic constructions.

BACKGROUND TO THE INVENTION

High speed cutting of any material can be effected by many arrangements between the cutter and the material being cut. However, there are certain limitations found in high speed cutting. For example, it has been noted that the greater the differential in the directional speed of the cutter relative to the directional speed of the material being cut, the poorer will be the quality of the cut in the material. If the object is to minimize poor quality cutting in a material, then it is desirable to minimize this differential in directional speed. Heretofore, this has been accomplished by reducing the directional speed in the material being cut. This, of course, materially increases the cost of the cutting operation.

Omnidirectional cutting means have the capacity of cutting in any direction. They have been utilized as fixed, reciprocating, oscillating, and pattern-following cutting means. They add a significant degree of versatility to the commercial cutting of a wide array of materials.

Omnidirectional cutting can be accomplished by a number of techniques including waterjet cutting, laser machining and cutting/routing (hereinafter called "omnidirectional cutters"). These techniques have been used where either the piece that is being cut is moved or the omnidirectional cutting means is moved. There are known processes where both are moved in linear or essentially linear directions. For example, the cutter is moved essentially laterally of the piece or the omnidirectional cutting means is oscillated within a small arc laterally into a linearly moving piece. To date, the art has not employed an omnidirectional cutting means where the object being cut is linearly moved and the cutting means is arc-directed into, across and in the direction of the object to effect an arc-defining cut, such as a slit, in the object.

Many of the materials which are subjected to omnidirectional cutting are batch fabricated and cutting of them is likewise a batch operation. Omnidirectional cutting has been used to configure and shape an article. If the cut in the object is complex, and the object is large, it is logical to find a way of moving the omnidirectional cutter across the material to generate the desired shape. See Francis, U.S. Pat. No. 2,736,349, patented Feb. 28, 1956, Wiatt, et al., U.S. Pat. No. 3,350,969, patented Nov. 7, 1967, Wiatt, U.S. Pat. No. 3,347,121, patented Oct. 17, 1967, and Lange, et al., U.S. Pat. No. 3,950,189, patented Apr. 13, 1976. However, if the object is relatively small and the cut is complex, then the object being cut would be manipulated and the cutting means would be kept in a stationary position. See PM&E, Jul. 1986.

There are materials such as plastic film, metal sheeting and textiles that are produced in continuous runs. There are situations when an arc-like cut is desirable in such materials. Heretofore, this has been accomplished by the use of reciprocating or oscillating cutting devices which fail to follow in the direction of the movement of the object being cut. If the cutting motion of the omnidirectional cutter is a straight line, as occurs when the cutter is moved in a straight-line reciprocating motion, and the continuous run of material is supplied in a rectilinear fashion, the resulting lateral cut into the material will be curved and the degree of the curve will depend on the relative speeds of the reciprocating cutter and the continuous run of material. Essentially the same patterns are obtained or obtainable when the omnidirectional cutter is oscillated across and into the rectilinearly moving material. An oscillating cutter is essentially the same as a reciprocating cutter. The differences between these techniques is that the reciprocating cutter travels a clearly rectilinear path while the oscillating cutter generates an arc path motion invariably against the direction of the material being cut. There is an obvious limitation on the design of the cut one may effect by such processes. See Litzka, U.S. Pat. Nos. 3,066,394, patented Dec. 4, 1962, Francis, U.S. Pat. No. 2,736,349, patented Feb. 28, 1956, Wiatt, et al., U.S. Pat. No. 3,350,969, patented Nov. 7, 1967, Wiatt, U.S. Pat. No. 3,347,121, patented Oct. 17, 1967, Kloehn, et al., U.S. Pat. No. 4,567,796, patented Feb. 4, 1986, and Kloehn, et al., U.S. Pat. No. 4,573,382, patented Mar. 4, 1986.

Reciprocation or oscillation of an omnidirectional cutting means rapidly into and out of an edge of a moving sheet of material produces a slanted slit having a gentle arc until the apex portion which is an abrupt curve that generates a parabolic slice defining a sharply formed or narrow apex (or tip). If such techniques are employed to effect a parabolic cut through a folded edge of a plastic or paper sheet, the unfolded sheet will not be an ellipse, but rather two (2) parabolas joined to form a hole and each juncture is an angle of about 30 or greater. At maximum line speed, this type of reciprocating cutting motion will typically create a poor quality cut because the cutting speed exceeds the speed at which the cutting stream most effectively cuts the material and because of the dynamic loads imposed on the cutter in the course of rapid cutter reciprocation which causes splaying of the cutter means during the turn-around. Kloehn, et al., U.S. Pat. No. 4,567,796, patented Feb. 4, 1986, and U.S. Pat. No. 4,573,382, patented Mar. 4, 1986. In order to vary the kind of cut performed by such cutters, it is necessary to cause them to alter their motion during the cutting action. This introduces complications in the mechanics of their operation. U.S. Pat. No. 4,573,382 is directed to the oscillating waterjet cutting of plastic sheeting to make leg holes in baby diaper constructions. The patent oscillates a cutter into the sheeting and with cam arrangements varies the cutter's motion within the sheeting to elongate the hole that is cut. Such a cutting operation can impart high dynamic loads on the nozzle of the cutter which imposes stress on the cam system controlling the nozzle's movement. According to the patent, at col. 4, lines 13 et seq., cam means are put under great stress when used in oscillator waterjet cutters and "these stresses seriously limit the speed at which the web 6 can be cut. . . " To "minimize," but not necessarily overcome the problem, a "compromise cutting line" for the fluid jet is followed. Such apparently results in a compromise in the achievable cutting patterns, exhibiting the limitations of a process that places undue stress on the apparatus.

Thus, reciprocating and oscillating cutting means, whether omnidirectional or not, have limitations as to rate of production and quality of the cut formed. This point is further illustrated by the following:

U.S. Pat. No. 4,624,654, patented Nov. 25, 1986 to Boyd, et al., describes a method and apparatus for manufacturing draw-tape bags. Included in the method of the patent is a step in which holes are provided in a hem portion of the bag. The patent describes this feature in the following manner (see column 2, lines 15-24).

"Yet another important aspect of the invention is that holes are provided in each hem between the folding and inserting steps so as to expose the subsequently inserted strip. In the described embodiment, the holes are cut at regular intervals along each hem as the material is continuously advanced between the folding and inserting steps. In particular, holes are punched simultaneously in the longitudinal fold edges of the hems as the material is continuously advanced."

The cutting of the hole is effected by a reciprocating punch. The patent describes this step in the following manner (see column 4, lines 4–17):

"The punch 28 forms a hole in the longitudinal edge of each hem. These holes are depicted in FIG. 5, the holes 44 and 46 being formed in the longitudinal edges 20' and 22' of the hems 40 and 42 respectively. Because the holes 44 and 46 are formed by removing a portion of the edge of each hem, a conventional reciprocating punch 28 can be used to cut holes 44 and 46 simultaneously through the two hems in a single descending motion. *Because it is pliable, the advancing material simply bends or deflects around the descended punch until the punch withdraws. The rate of the punch 28 is coordinated with the film advance rate of the pinch rollers 24 to form holes 44 and 46 at regular, one bag pitch intervals along the length of the advancing film 12.*"(Emphasis supplied)

This patentee depends, in forming the hole, on the pliability of the plastic being cut. The patentee depends on the bending and deflection of the plastic around the descended punch until it is withdrawn. This is a clear indication that the rate at which the film can be advanced has to be limited by the rate of the hole puncher and the pliability of the material being punched. If the material were not as pliable as the bag materials the patentee was cutting, then, of course, take-up rollers would have to be included in the line before the cutters, and tensioning rollers would have to be employed after the cutter in order to accommodate the stop motion required by the cutting action. However, in the case of the patent, the dependence upon the pliability of the plastic to allow hole cutting without stopping the movement of the film results in a very coarse looking cut pattern in the plastic. In any event, the reciprocating puncher introduces a stop motion into the process where the plastic is continuously advanced.

It would be desirable to be able to effect a repetitive pattern of an arc cut in a continuous run of a recipient surface without having to slow or stop the run or without altering the direction of motion of the cutting means or without depending upon the pliability of the recipient surface to take up the stop motion or slow down in motion which is inherent in the utilization of such reciprocating cutters or punches.

It would be desirable to effect an arc cut in a sheeting material which is not limited by stresses imposed on the cutting means because of reciprocating or oscillating motions.

This invention is directed to a process and apparatus for making an arc cut in a sheeting material which avoids the disadvantages of this prior art.

THE INVENTION

The invention relates to a process for making a repetitive arc cut in a continuous manner in a continuous supply of sheeting possessing edges. In its implementation, a moving sheeting is passed across a cutting area and while the sheeting is in the cutting area, an arc-directed omnidirectional cutting means is passed in an arc-defined motion across an edge of the sheeting in the direction of movement of the sheeting at a rate greater than that of the directional velocity of the sheeting to puncture at least a portion of the moving sheeting; maintaining the arc directed velocity of the omnidirectional cutting means at a rate (velocity) greater than that of the directional velocity of the sheeting such that the puncture is enlarged to a lineal cut. The most favorable application of the invention involves the use of waterjet cutting to cut curved slits and holes, especially primarily round holes, in multi-wall plastic constructions.

The invention encompasses an apparatus for making a repetitive arc cut in a continuous manner in a continuous supply of sheeting possessing edges. The apparatus involves means for receiving a moving sheeting having edges in a cutting area thereof, means for passing an arc-directed omnidirectional cutting means through the cutting area, over an edge of the sheeting and in the direction of movement of the sheeting, at a rate greater than the rate of the sheeting, means for puncturing the sheeting and initiating the cutting with the omnidirectional cutting means of the sheeting within the cutting area, means for withdrawing the omnidirectional cutting means from the area, and means for withdrawing the cut portion of the sheeting from the cutting area.

BRIEF DESCRIPTION OF THE DRAWINGS

FIGS. 1A, 1B and 1C schematically illustrate stages of the making of a primarily round cut in a continuous sheet of plastic with a rotating omnidirectional cutter.

DETAILS OF THE INVENTION

Figure 2:
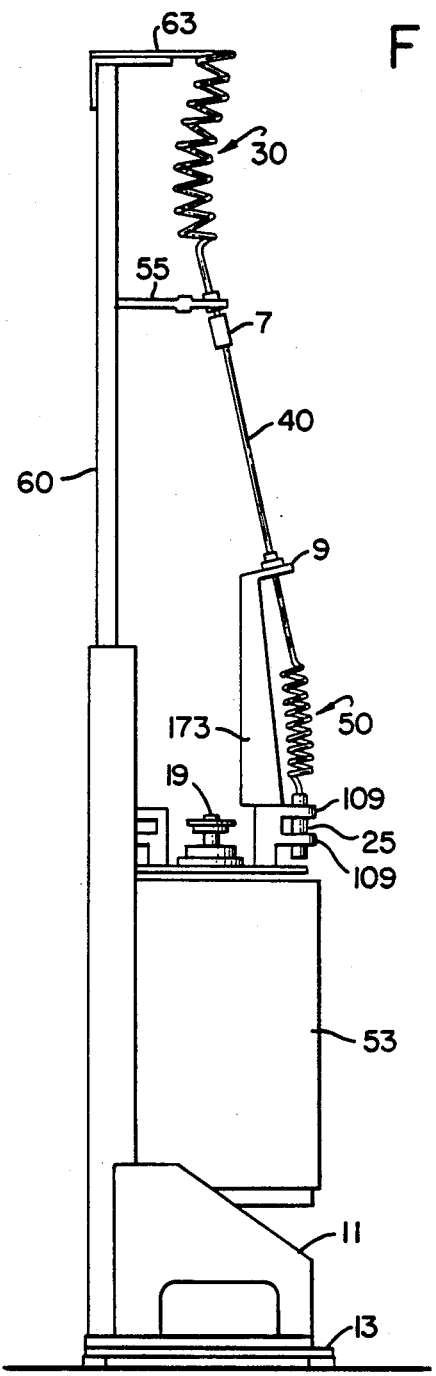
FIGS. 2-6 are various sectional views of a rotating omnidirectional cutter in which a variety of sheeting can be appropriately cut to provide an arc-directed cutting pattern in the sheeting. The cutter of FIGS. 2-6 is especially desirable for cutting essentially round-like holes in the hem of a draw-tape bag.

The invention embraces a process and apparatus for effectuating repeating patterns of arc cuts in a supply of an advancing sheeting continuously, and preferably rectilinearly, moving through a cutting area. They comprise moving (with means to effect such movement) an omnidirectional cutter at a constant rate across the cutting area in a direction which is angular to the perpendicular of the rectilinear direction of the sheeting, imposing the cutting action (with means to effect such cutting) on the sheeting in the direction of movement of the sheeting within the cutting area to puncture the surface of the sheeting and making a cut therein, then passing (with means to effect such passing) the cutting means from the sheeting within the cutting area, and removing the cut portion of the sheeting from the cutting area by the continuous advancement of the sheeting. The process and apparatus of the invention accomplish the arc cutting of the sheeting without undergoing the stop motion existing in reciprocating and oscillating cutting and cutters.

The invention contemplates the cutting of moving sheeting material with an omnidirectional cutter where the motion of the cutter during cutting of the material is simultaneously lateral and longitudinal such that the cutter sweeps in a smooth and continuous arc motion over the sheeting material. The arc motion of the cutter is in the direction of travel of the sheeting material. A feature of the invention is that the omnidirectional cutter moves at a velocity which is greater than the material being cut.

An advantage of the invention is that it allows for high speed cutting while minimizing the degree of distortion (poor quality) in the cut in the sheeting, and such is effected without slowing down the directional speed of the sheeting (the productivity factor). The invention operates by imparting to the cutter a directional velocity in the direction of the sheeting so as to minimize the advancing cutting action of the cutter on the sheeting and to eliminate making the cutting action dependent on the movement of the sheeting into the cutting means. By having the cutter move (as compared to a stationary position) in the direction of the sheeting, one alters the difference between their directional velocities and this difference in their directional velocities becomes the directional velocity of the cutting action. By controlling the relative directional velocity between the cutter and the sheeting one can control the quality of the cut in the sheeting. This, of course, is correlated with the cutting force of the cutting means to optimize the quality of the cut in the sheeting.

The invention also provides that the directional velocity of the cutting means is greater than the directional velocity of the sheeting. This assures, in the typical case, that the cutting action need not act to limit the line speed of an operation in which cutting is an integral part. This means that in the course of cutting, the cutting action will be effected at a directional speed which may be slower than, equal to or greater than the directional speed of the sheeting dependent on the geometry of the design.

The invention embraces a process and apparatus for effectuating the selvage cutting of a sheeting such as thermoplastic polymeric sheeting. The invention relates inter alias to the selvage cutting of thermoplastic polymeric sheeting, defined as sheeting made of a thermoplastic polymer that has the capacity to be deformed by extension such that unsightly stretched portions of the polymer can be formed at the cut line when the polymer is cut. It is an object of this invention to minimize the occurrences of such unsightly stretched portions.

The term "selvage" embraces the edge portion of a sheet without defining its size. It typically refers to an edge portion in which a part is intended to be cut and discarded. In accordance with the terms of this invention, as set forth in this specification and the claims, the term selvage is not narrowly defined and embraces a side of the sheet extending from the center line thereof. This is a reasonable characterization of the term and is embraced by its normal definition because the size of a selvage, in any case, is dependent on a subjective standard. In addition, not all of the selvage need be cut. Only a portion of the selvage need be cut or a partial cut made in a portion of the selvage, in accordance with this invention. Moreover, the cut in the selvage need not generate a removable piece from the selvage, though in the preferred practice of this invention, the cut in the selvage results in the generation of a removable piece from the material.

The word edge is used herein and in the claims to mean "the line where an object or area begins or ends." The term edge portion is used herein and in the claims to mean the part of the sheeting near the edge and is inclusive of the edge. In its broadest connotation, the term edge portion includes that part of the sheeting extending from the center line to an edge of the sheeting.

The process and apparatus of the invention have the capacity of cutting out a portion of the sheeting from an edge portion of the sheeting or effecting a cut or series of cuts in the edge portion. In the latter case, the cut may constitute a single slice starting either from an edge, terminating at an edge or existing within the edge portion but removed from the edge. There may be a series of cuts as in a perforation so that the portion within the perforation may be torn from the sheeting.

In the preferred embodiment, the omnidirectional cutting is effected starting from a point at an edge of the sheeting and terminating at another point on the same edge so that the slit in the sheeting starts on the omnidirectional cutter's path over the edge of the sheeting and ends when the omnidirectional cutter is removed from a position over the sheeting by crossing the same edge.

In the preferred aspect of the invention, cutting in the sheeting is effected by the use of a revolving cutter action. Such materially reduces the dynamic loads on the cutter when it changes the cutting pattern to make a cut in the sheeting in a different direction. This allows one to effect higher speed cutting with less introduction of stress on the cutter than other cutting methods, such as reciprocal and oscillating cutting (see the previous discussion regarding Kloehn, et al., U.S. Pat. Nos. 4,567,796 and 4,573,382).

Another advantage of the apparatus of the invention is that is can generate at high speed an arc cut in the sheeting material that can have a tangent which is parallel to the rectilinear direction of the sheeting material. A further advantage of the invention is that it can generate at high speed an arc cut starting from an edge of the sheeting and terminating at a different point of the same edge in which the arc has a tangent which is parallel to the rectilinear direction of the sheeting. The preferred means of the invention generates such an arc cut.

Sheeting, as used herein and in the claims, represents any three-dimensional material which possesses two opposite facing surfaces separated by edging surfaces. The opposite facing surfaces may be mono- or poly-planar and the combined surfaces typically (and preferably) possess many times the area of the edge surfaces. The sheeting employed in the practice of the invention may be made of any material capable of being cut by an omnidirectional cutter, such as a waterjet cutter, and may be made of plastic, resin, metal, textile, fiber reinforced plastic or resin, ceramic, glass, rubber, paper and cardboard, wallboard, composites thereof, and the like. The preferred sheeting used in the practice of the invention are thermoplastic films such as one or more layers of one or more of polyethylene (low density, high density, linear low density and/or combinations), polypropylene, polyethylene copolymers (low density, linear low density and/or combinations), polybutylenes, ABS polymers, polyurethanes, polycarbonates, polysulphones, aliphatic polyamides, polyarylamides, polyaryletherketones, polyarylimideamides, polyaryletherimides, polyesters, polyarylates, polyoxymethylene, poly(epsilon-caprolactone), and the like, alone or composited with a variety of materials such as metal films, paper, carboard, textile structures, wood, and the like.

The invention is directed to novel apparatus for effecting the arc-directed cutting in a continuous supply of a sheeting, as aforedescribed.

The apparatus of the invention for making a repetitive arc cut in a continuous manner in a continuous supply of sheeting possessing edges comprises (a) means for receiving a moving sheeting having edges in a cutting area thereof, (b) means for passing an arc-directed omnidirectional cutting means through the cutting area, over the area to be occupied by an edge of the sheeting and in the direction of movement of the sheeting, at a rate greater than the rate of movement of the sheeting, (c) means for puncturing the sheeting located in the cutting area and initiating the cutting with the omnidirectional cutting means of the sheeting within the cutting area, (d) means for withdrawing the omnidirectional cutting means from the area, and (e) means for withdrawing the cut portion of the sheeting from the cutting area.

The preferred embodiment of the invention involves the arc-directed cutting of holes in the hem portion of plastic sheeting to be made into bags designed for inclusion of draw tapes. Such types of sheeting and bags are illustrated in U.S. Pat. No. 4,624,654, supra. The cutting device of this invention may be used as part of a multi-step bag making assembly and process. The invention allows the high speed cutting in a hem portion of a plastic sheeting moving in a lineal direction at speeds of, e.g., greater than about 2.5 independent and full cuts per second. Whereas in the prior art, hole cutting in the manufacture of plastic draw tape bags constituted a rate limiting step in the manufacture of the bags, such no longer need be the case because of this invention.

The principles of the invention are described in FIGS. 1A, 1B and 1C. Apparatus which achieve embodiments of the principles are depicted in FIGS. 2–7.

With respect to FIGS. 1A, 1B and 1C, is a plan view of the top of sheeting 101 which is a continuous plastic film (preferably polyethylene film) being moved continuously in the direction of the arrow (to the left) on a conveyor or roller combination, not shown. Suitable conveyors are endless belts, see U.S. Pat. Nos. 4,567,796, 3,614,369 and 4,335,636, or roller combinations such described in U.S. Pat. No. 4,624,654. Sheeting 101 contains a hem portion 102 in which the plastic is folded over to make a double layer of the plastic film which terminates at hatched line 104. Sheeting 101 can represent one or more layers of folded over plastic film, and in a preferred embodiment of making draw tape bag structures, it comprises two (2) such layers. Though the hem turns in the bottom direction, it could, in the practice of the invention, be turned in the top direction. In these figures, an omnidirectional cutting device 106 is revolved along path or circle 105 about the rotational axis of arm 103 in a counterclockwise direction, which is leftward in the indicated direction of travel of sheeting 101. The path of device 106 is configured to cut across a portion of the hem region of sheeting 101. In FIGS. 1A, 1B and 1C, the line speed is selected to be 100 inches per second and the speed of revolution of device 6 is selected to be 145.4 inches per second along path 105.

FIG. 1A shows that, as the cutting component of the cutting device 106 penetrates sheeting 101 within the hem portion(s), the intended arc of device 106 is that between points A and B. However, FIG. 1B shows that the advancing film(s) reduces the relative cutting speed which is the difference between the speed of the cutting device (constant in this case) and the speed of the advancing film (also constant in this case), and this shortens the distance of the arc such that the penetration point and the apex of the arc are defined by the curve A'C. If one measures cutting speed by a unit of measurement in a given time, the relative cutting speed of the sheeting in this case varies with the position of the cutting device 106 over the sheeting 101 and the cutting speed can vary from a higher and lower cutting speed, in the course of travel of cutting device 106, than the speed of sheeting 101. A differential of the natural arc of device 106 and actual arc cut of device 106 is defined by the space ACA'. In the course of the downward swing from apex C of the device 106 to point B of the natural arc, there is created the actual cut, arc BC. The time period from the initial penetration of sheeting 101, as shown in FIG. 1A, to the withdrawal of device 106 from sheeting 101, as shown in FIG. 1C, is 0.05 seconds. If the hem(s) were to be opened up, such that the underside lies flat on the same plane as the remainder of the sheet, the primarily round cut defined as A'CB would be characterized as a mirror image to define a primarily round hole in the opened-up sheeting 101. The cutout piece D of the sheeting 101 which would be removed is hereinafter called the "slug".

An advantage of the system defined in FIGS. 1A–C, in which the cutting device 106 rotates in the direction of sheeting 101, resides in the handling of slug D. If the direction of cutting device 106 were in a clockwise direction and against the direction of sheeting 101, the initial penetration of sheeting 101 would have been at point B. As device 106 would continue to penetrate into sheeting 101, the cut defined by line BC would have been basically unsupported as it moves forward. Such would cause the slug to vibrate and billow in response to the air currents generated about sheeting 101 at the speed characterized above and this would make slug handling a nuisance. This problem, of course, can be dealt with by introducing a complicated clamping device over the unsupported portion of the slug as it forms. Such is not needed when the cut is made in the direction of travel of sheeting 101 because the slug D that is being generated trails and is supported by the uncut portion of the sheeting. The slug is, therefore, not as susceptible to vibration and billowing factors. A hold down device is shown below for keeping the slug on the rotating table in order to remove it from the vicinity of the moving sheeting.

FIGS. 1A–C make apparent that, if cutting device 106 can be advanced simultaneously (a) in a rotational manner about the axis of arm 103 and (b) forward by the forward movement of the axis of arm 103 along an imaginary track parallel to and with the direction of sheeting 101, device 106 can be made to generate a variety of different shape cuts in sheeting 101. That cut could be more extensive, generating a broader swathe across sheeting 101 and generating a larger hole in the hem portion. That motion, coupled with a slower rotational motion, could achieve the same cut as the semicircular A'CB as depicted in FIG. 1C. The nature of the arc-like cut in sheeting 101 can be significantly varied. Such variations can be extended by altering the angle relationship of the rotational plane of the cutting device 106 to the plane of the sheeting 101. It is also apparent that one can make an arc-like cut which has a deeper and more extensive penetration into sheeting 101 and-/or by varying the direction of passage of cutting device 106, generate a cut in sheeting 101 which is considerably different from the semicircular cut depicted in FIG. 1C. A number of cam arrangements can be added to the apparatus to vary the position of the axis of arm 103 during the rotation of arm 103. Such can be used to cut a wide variety of designs in a moving sheeting. For example, the axis to arm 103 can be fixed in a rotatable slotted hole by a tensioning spring which in turn is bolted onto a cam follower that is locked into a track circumscribing a cam assembly. The cam assembly can provide a variety of cutting designs for the cutting device 106 to perform in sheeting 101, such as a fleur-de-lis. In addition, the cutting device 106 can be provided with a clutch mechanism that alters its speed in the course of cutting sheeting 101. For example, shortly after cutting device 106 penetrates sheeting 101, prior to point C, its speed of revolution can be slowed down for a short distance and then brought back up to the original speed. If this alteration in speed were repeated after point C, it is possible to generate a mushroom-like cut pattern in the hem 102. In addition to varying the travel of the cutting device 106 over the sheeting 101, the cutting device 106 can be designed to tilt in any direction as it travels over sheeting 101. In such a variation, if one is employing waterjet cutting, it is desirable to have the path for water removal appropriately positioned to accommodate the altered position of the cutting device. The variety of cutting patterns that one can generate is almost limitless. Using a combination of cam and clutch arrangements, it is possible to effect such a variety of cutting patterns without having to employ cam arrangements which cause high dynamic loads on the cutting device.

Though the invention contemplates the ability to effect an arc-like cut with any of the various omnidirectional cutters, the invention is particularly directed to the utilization of waterjet cutting as the means for effecting the arc cut. Waterjet cutting is an extremely well defined art. There are a number of commerical waterjet cutting systems. Essentially all work pursuant to the same technology. Water is feed under high pressure, as high as 60,000 psi, through an extremely small nozzle having a diameter ranging from about 0.02 inch to about 0.003 inch (about 0.0508 cm to about 0.00762 cm). The water passes through the nozzle at more than twice the speed of sound creating a very concentrated force which is projected upon a very small area and this produces the puncturing or breakthrough effect upon whatever item to which the waterjet is projected. Water alone may be all that is required. This is dependent upon the particular item that is being subject to waterjet cutting. However, if the sheeting to be cut is more resistant to cutting by water, than an abrasive can be added to the water stream. Such abrasive allows waterjet cutting to be effective for steel of over three inches (3″) thick and concrete of up to 12 inches in thickness. The technology of using abrasive materials for waterjet cutting is established.

One of the advantages of waterjet cutting is the size of the kerf generated. It is typically smaller than that generated by other omnidirectional techniques and, therefore, provides an additional benefit. The kerf is nominally in the 0.005″ (0.0127 cm) to about 0.011″ (0.02794 cm) range. In addition, waterjet cutting does not require a starting hole in order to initiate an arc-like kerf; therefore, kerfs, which are only arc-like cuts, can be introduced into the interior of sheeting without initiating the puncture at an outer edge. For example, with respect to FIGS. 1A–C, if waterjet cutting were employed as the device 106, the kerf generated could be initiated at any point defined by arc A'CB. In the case of a hem-like structure, defined in FIGS. 1A–C, the kerf could extend from points A' to point C and then the waterjet cutting can be terminated. This would leave a semicircular kerf in the sheeting which could act as a flap, if a flap were desired for any particular application of the sheeting. Such flaps are commonly cut in large plastic or fabric display items used outdoors.

FIGS. 2–7 illustrate apparatus which effectively utilize waterjet cutting in accordance with the process of the invention.

The apparatus of FIGS. 2–6 comprise a rotating table having a perimeter and having rotatively affixed thereto an omnidirectional cutting means openly connected to the perimeter of the table, which omnidirectional cutting means has a rotating axis aligned parallel with the axis of the table, and means for synchronizing the rotation of the cutting means with the position of the table during its rotation such that the revolution of the cutting means on the rotation of the table does not essentially change the facing direction of the cutting means. In the preferred apparatus of FIGS. 2–6 the drive for the rotation of the table is the drive for the synchronizing means.

FIG. 2 is a side view of the significant components of a cutter apparatus of the invention which are further detailed in FIGS. 3–6. In FIG. 2 there is characterized cutter assembly 25 attached to waterjet supply coil tube section 50. The waterjet assembly 25 and the waterjet supply coil tube section 50 are affixed to support bracket 173 at bearings 9 and 109. The water supply to jet assembly 25 is effected through upper tube coil section 30, then through straightened tube section 40 and into waterjet supply coil tube section 50. The tubes are joined at coupling 7 and held in position by tube support bridge mounts 55 and 63. The whole tube assembly is locked into main tube support 60.

Associated with waterjet cutter assembly 25 is shaft assembly 19 and water catch tank 53. The whole apparatus is supported by slidable form platform 11 bolted through slots into a base plate 13 so that platform 11 can be moved forward and back one inch or more.

The principle involved in the operation of the cutting apparatus of FIG. 2 is as follows: Waterjet assembly 25 provides the waterjet stream which punctures and cuts the sheeting material. It follows that the sheeting material is passed under waterjet assembly 25. The sheeting can be supplied in a number of ways, such as on belt conveyors or on rollers, as mentioned above. The function of the conveyance is to move the sheeting continuously into and out of the cutter at the rate desired. Conventional belt conveyors and rollers are suitable. The water catch tank 53 has a function of collecting water emitted from waterjet assembly 25. The waterjet assembly 25 is caused to revolve, in a clockwise direction in a circular path as illustrated in FIGS. 1A–C, supra, by the rotation of the table on which it sits. The coil sections 30 and 50 of the water tubing serve to reduce stress caused by any torque imposed in the tubing during revolutions of the waterjet assembly 25. Waterjet assembly 25, while revolving in the clockwise direction, undergoes a rotation in the opposite direction such that its north-south position remains constant during each full revolution. As a result, a minimum amount of torque is imposed upon coil tube sections 30 and 50 and on tube section 40. Coil sections 30 and 50 assure flexibility in the water tube during revolution of waterjet assembly 25.

Figure 3:
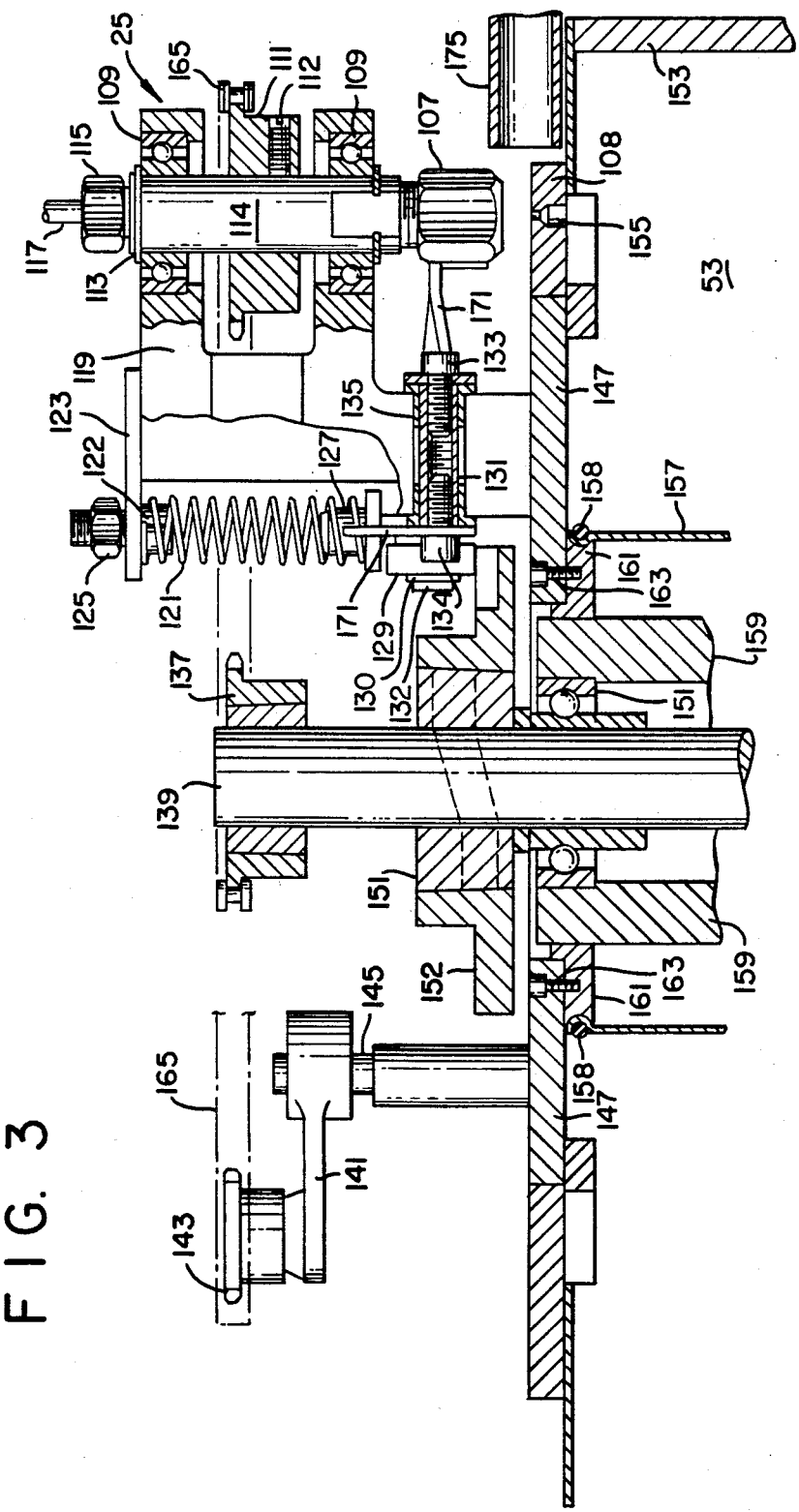
Figure 4:
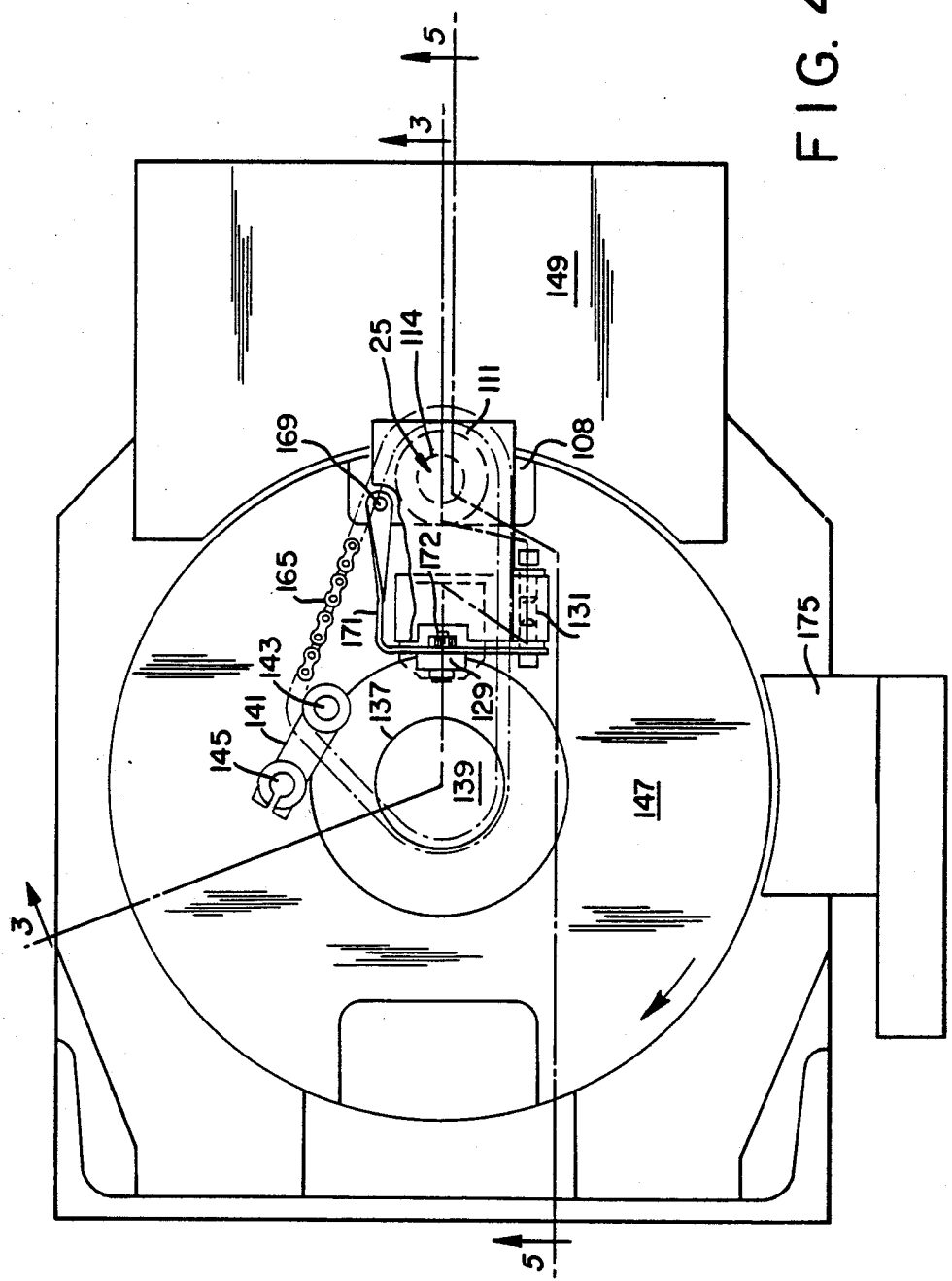

With respect to FIG. 3, taken along lines 3—3 shown in FIG. 4, there is shown a partial cutaway side view of waterjet assembly 25, the assembly for effecting the revolution and rotation of the waterjet assembly 25, and other components. Waterjet assembly 25 comprises bearings 109 and sprocket 111, roller chain 165, snap ring 113, tube holding nut 115 and connecting tube section 117 which forms part of the terminal portion of coil tube section 50. The bearings 109 form part of the waterjet housing assembly 119. Sprocket 111 is tightly secured to rotatively mounted waterjet passage section 114 by screw 112. The jet of water issues from waterjet nozzle 107. The diameter of the nozzle opening of waterjet nozzle 107 may range from 0.004 to 0.012 inch (0.001 to 0.031 cm), and for the cutting of multilayers of plastic film, an opening diameter of 0.005 inch (0.013 cm). Located below the waterjet nozzle is insert plate 108 in which is located a small hole characterized as water passage 155 which passes the water into tank 53. Water passage 155 may have a diameter of about 1/32 to about ⅛ inch (0.078 to 0.3175 cm). The size of passage is dependent on size of the nozzle 107 opening, the distance of nozzle 107 from passage 155 and the water pressure. If nozzle 107 is about ¼ inch (0.635 cm) from passage 155, using a pressure of 40,000 psi, passage 155 may have a diameter of 0.06 inch (0.152 cm). Insert plate 108 forms part of waterjet rotating mounting table 147. Waterjet housing assembly 25 is bolted (not shown) to waterjet rotating mounting table 147. Table 147 is bolted (via bolt 163) to rotatable shaft 159 via shaft flange 161.

At this stage in the characterization of FIG. 3, it is worthwhile to look at the top view offered by FIG. 4. One can see that as table 147 is rotated in the clockwise direction, the waterjet assembly 25 bolted to Plate 147 revolves to follow the rotation. Such action would cause an immediate twist to be imposed upon tubing section 117. To avoid this, there is provided means by which waterjet passage section 114 can be rotated simultaneously with the revolution of waterjet assembly 25 in a direction which removes the possibility of such torque action occurring. This is done by rotating section 114 in a counterclockwise direction such that its position (insofar as torque buildup is concerned) relative to tube 117 does not change.

In order to accomplish this, sprocket 111 is caused to rotate in a counterclockwise direction by connection with roller chain (having connected links) 165 which is looped about idler sprocket 143 and sprocketed bushing 137. The sprockets are the same size to insure the relative position of section 114. The chain link 165 circumscribes and is meshed with sprockets 137, 111 and 143. It is kept under tension by idler arm 141 mounted on idler shaft 145. Sprocketed bearing 137 is mounted on stationary shaft 139 which extends through waterjet tank 53. Rotatable shaft 159 is mounted to a motor and gear assembly (not shown) to cause the rotation of table 147. Shafts 159 and 139 are separated by bearing 151.

Located above table 147 and affixed to shaft 139 is bushing 151 containing cam surface 152. Cam surface 152 plays a part in the removal of the slug from the sheeting and does not play a part in the actual cutting activity of the waterjet cutter. Located to the side of the waterjet cutter is hold-down pin 169 which is controlled by the employment of cam surface 152 as discussed below. Pin 169 is hidden behind nozzle 107 in FIG. 3 and is shown to be on the counterclockwise side of waterjet assembly 25 in FIG. 4. It is connected to hold-down lever 171. Lever 171 tracks about the back of waterjet housing assembly 119, rides on the axle 130 of cam follower roller 129 and supports tracking spring 121. Lever 171 is rotatively affixed to rod 131 which is held in housing 135 by lock nuts 133 and 134.

Tensioning spring 121 is held in position by and between spring guides 122 and 127. Guide 127 sits on lever 171 and assures that follower roller 129 tracks cam surface 152. Spring 121 is held in position by retainer 123 screwed to housing 119. Nut 125 is screwed onto the threaded end of guide 122 to lock the spring onto retainer 123. Follower roller 129 rides on shaft 130 about bearings 132. Shaft 130 extends through lever 171 and its threaded portion extends on the other side of lever 171 where it is bolted in position by bolt 172, see FIG. 4.

Affixed to the top of water catch tank 53 is dead plate 149. It serves to support the sheeting as it is fed between the mounting table 147 and the waterjet nozzle 107. As the slug is cut in the sheeting by the water stream issuing from waterjet nozzle 107, it is held in position on table 147 by hold-down pin 169 and separated from the sheeting by the rotation of table 147. It is transported to the position of vacuum nozzle 175 which is connected to a vacuum assembly (not shown). The proper location of vacuum nozzle 175 is shown in FIG. 4. Its height relative to mounting table 147 is characterized in FIG. 3. At this point, follower roller 129 is caused to rise by a rise in cam surface 152 and this lifts lever 171 which lifts pin 169 from the slug. This releases the slug and it is drawn by the vacuum into vacuum nozzle 175 from table 147. From that point until pin 169 is again over the sheeting, it is kept in an "up" position. As the waterjet crosses over the sheeting, pin 169 is caused by cam surface 152 and roller 129 to drop onto and frictionally affix the slug to table 147. The sequence is thereafter repeated.

If the slug in any embodiment is difficult to withdraw from table 147 into the vacuum nozzle 175, one may provide an air "puff" to assist the slug from the table so that it can be caught up in the vacuum. This can be effected by incorporating an air outlet from a compressor in a location in table 147 where the slug is formed and releasing a puff of air into the slug when it is transported to the vicinity of the vacuum nozzle 175 to assist in its removal from table 147.

Tank 53 is a cylindrical tank which contains in its central interior shafts 139 and 159. They are protected there by skirt 157 which is held to flange 161 by holddown wire ring 158. Below the interior of skirt 157 is splash guard 162 which circumscribes both shafts. Water is collected within tank 53 between tank wall 153 and splash guard 162, and withdrawn through a port (not shown) at the bottom of the tank.

A favorable embodiment involves the use of a water channel associated with passage 155 which moves the water stream from the vicinity of table 147. Such a channel can comprise a metal or plastic tubing openly connected to the opening of passage 155 which extends into the interior of tank 53 below the water level therein. This technique reduces splashback and moisture penetration of seals about tank 53.

Figure 5:
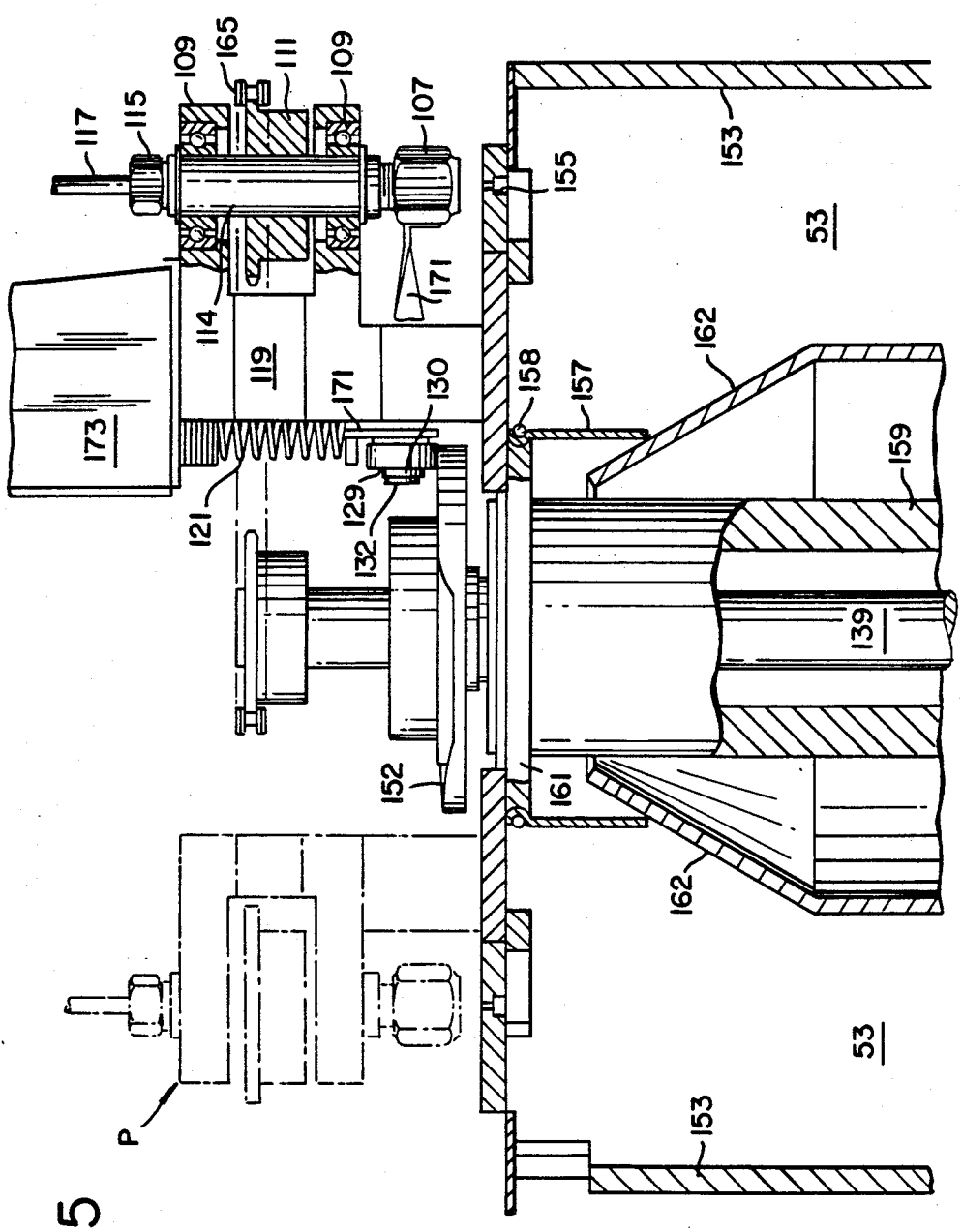
Figure 6:
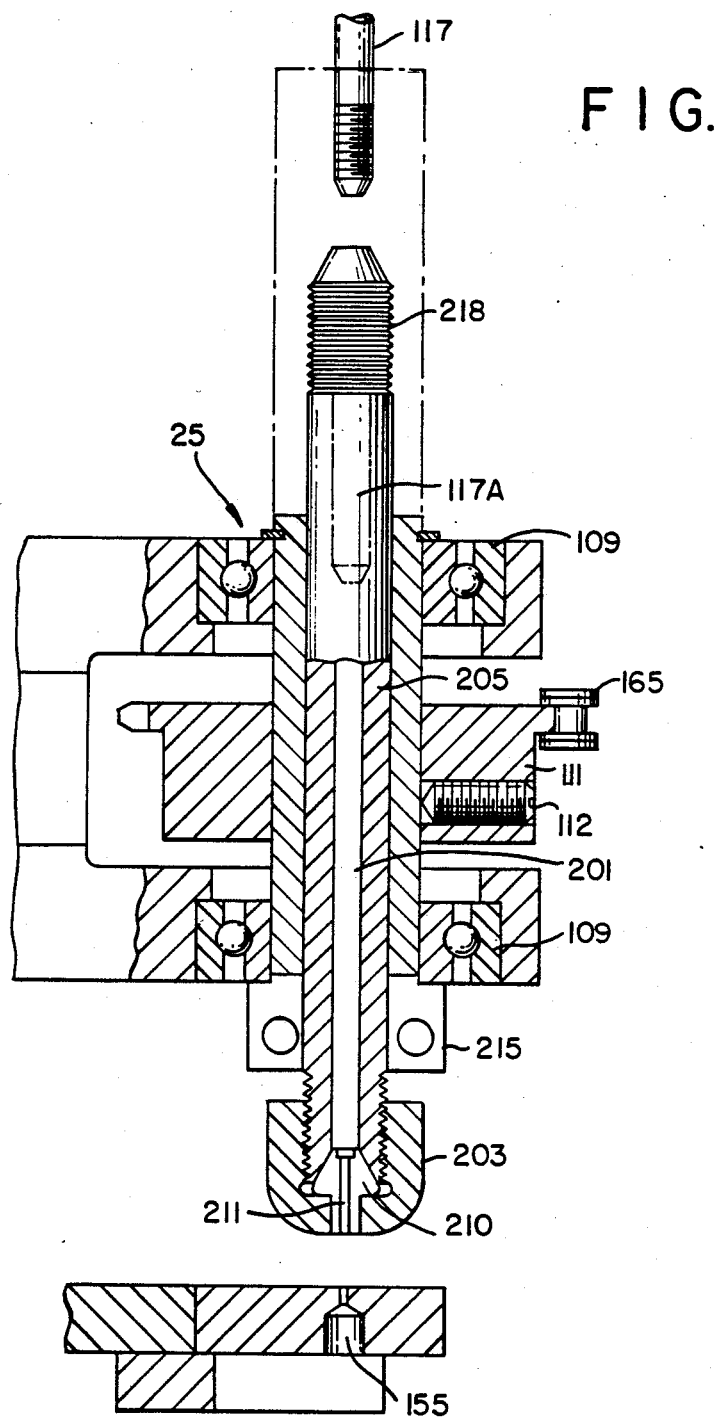

FIG. 4 is a top view which characterizes the relationship of the rotatable table 147 and waterjet assembly 25, as well as the position of vacuum nozzle 175. FIG. 5, which is a cross sectional and partial cutaway taken along lines 5—5 of FIG. 4 of the apparatus of FIG. 2, gives further details of the water tank 53, the shafts 159 and 139, splash guard 162 and skirt 157. It also shows the relationship of support bracket 173 to assembly 119 and, in phantom, P, displays the position of housing assembly 119 and waterjet assembly 25 as the table 147 is rotated such that the waterjet assembly 25 is positioned opposite to that necessary to effect arc-like cutting of sheeting passed continuously through the cutting device. FIG. 6 is a cross-sectional view of an alternative of a waterjet nozzle assembly 25. It shows bearings 109 and sprocket 111 to which is affixed chain 165. The waterjet assembly comprises a metal pipe 205 with cylindrical internal water passage 201 leading from tube section 117 to screwed-on nozzle 203. In FIG. 6, tube section 117 thread fits in position 117A in the interior in of pipe 205 flush to passage 201. Pipe 205 is provided with threaded section 218 so that section 117 is secured within pipe 205 by nut 115. Nozzle 203 is provided with nozzle nut 210 which retains nozzle orifice 211. Circumscribing pipe 205 is nozzle sleeve 215 which holds the nozzle in the bearings.

Water supplied to the waterjet assembly 25 can be effected with any of the commercially available waterjet systems. A number of commercially available systems are described in PIM&E, Jul. 1986, Modern Plastics, Sept., 1986, Managing Automation, Mar., 1987. Useful descriptions of waterjet systems can be found in Olsen, Cutting By Waterjet, Feb., 1980, published by Flow Systems, Inc., Kent, Wash. 98031.

Certain sheeting materials, to be cut according to the invention, require the use of abrasives. This is particularly the case where the sheeting material is a composite, metal or ceramic. Abrasives can be provided in the process of the invention in accordance with techniques well known in the art; see Hashish, Application of Abrasive Waterjet to Metal Cutting, Jan. 1, 1986, published by Flow Industries, Inc., Kent, Wash. 98032 and Adams, Waterjet Machining of Composites, Jan., 1986 conference (Los Angeles, CA), published by Society of Manufacturing Engineers, Dearborn, Mich. 48121.

The orifice of the waterjet nozzle may be made of abrasive resistant materials such as stainless steel, sapphire, diamond, tungsten carbide and the like. The interior water passage may be made of a variety of materials ranging from stainless steel, nickel-stainless steel alloys, tungsten carbide, and the like. Sapphire and tungsten carbide coated orifices are the preferred waterjet nozzles.

Figure 7:
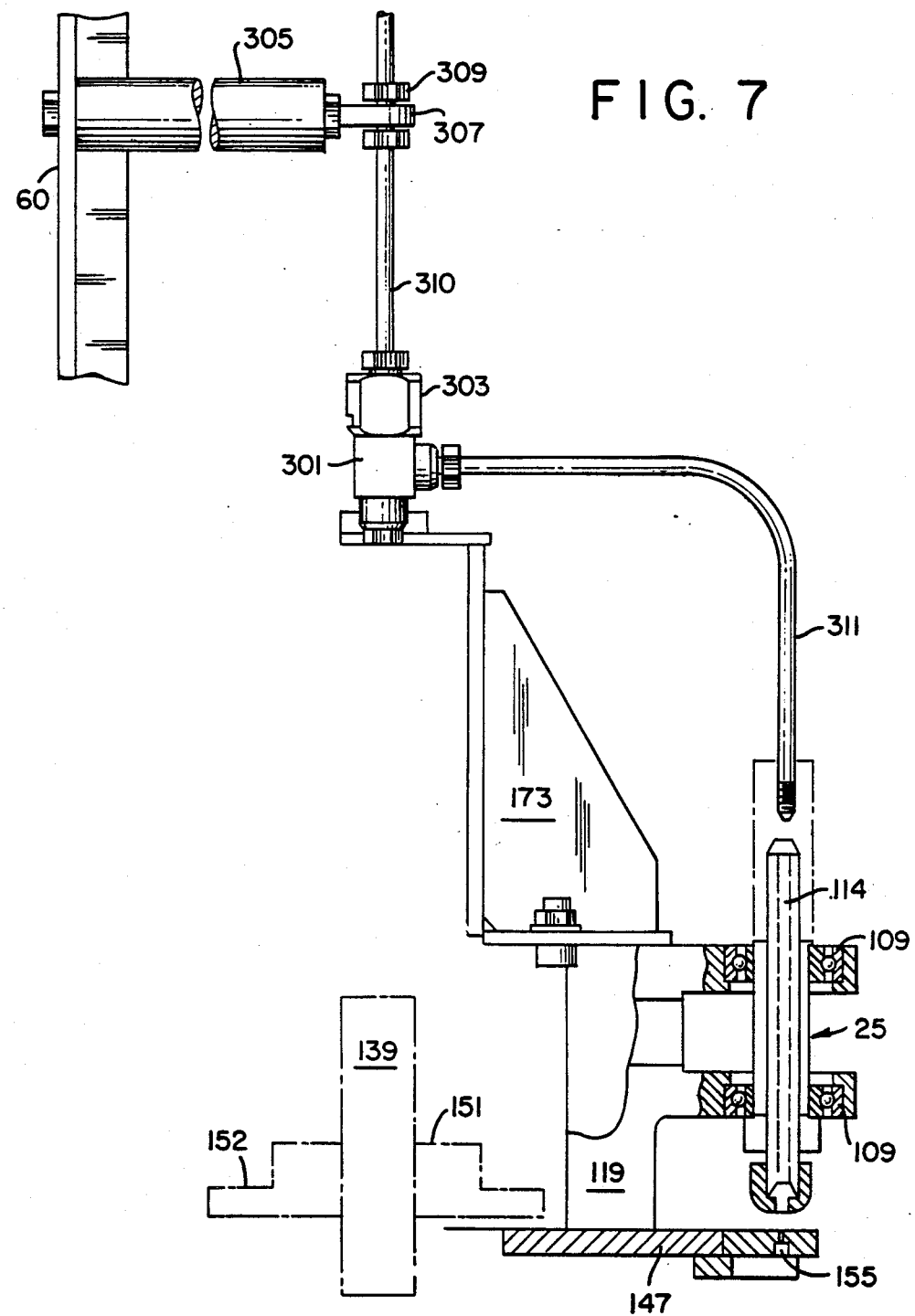
FIG. 7 is a sectional view of an alternative cutter assembly to that depicted in FIGS. 2-6.

FIG. 7 is a partial cross-sectional view of a modification in water supply lines feeding waterjet assembly 25. Its primary difference resides in operating the cutter without the sprocket-chain assembly shown in FIGS. 2-6. Torque elimination is achieved by joining feed tube 311 from waterjet assembly 25 to high pressure rotary union 301 which, in turn, is connected to tube coupler 303 to fix water supply tube 310 in open relationship with union 301 and tube 311. Tube 310 is supported by tube coupler 309, held in position by rod end 307. This water feed assembly is supported by bridge mount 305 which is bolted to frame 60. The rotary capability of union 301 allows tube 311 to track the revolutions of assembly 25 without inducing torque in the tubing. The major problem with this apparatus configuration is the vulnerability of union 301 to withstand the high water pressures employed in the process.

In those cases where there is a desire to effect a cut in the edge portion that fails to generate a removable piece from the sheeting, it is desirable to introduce the capacity to stop and/or start the waterjet cutter as it traverses the cutting area. By this procedure, the cut can be initiated at an edge or within an edge portion. Such a technique can be used to produce a plurality of cuts within the edge portion as in the case of a perforated cut of the sheeting. The means for doing this is commercially available. There is a cutting device called Instajet TM, made by Flow Systems, Inc., Kent, Wash. 98031. It comprises a pneumatically actuated, normally closed, on/off valve integrated with a waterjet nozzle assembly. Its five basic components comprise an actuator, a valve body, a poppet (lift valve) assembly, an orifice mount assembly and the nozzle nut. Such a device can be used in place of assembly 25.

I claim:

1. A process for making a repetitive arc cut in a continuous manner in a continuous supply of plastic sheeting possessing edges which comprises passing a continuous supply of plastic sheeting across a cutting area and while therein an arc-directed omnidirectional cutting means follows along a 360 degree circular path, a portion of which passes through a cutting area in an arc-defined motion across an edge of the sheeting in the direction of movement of the sheeting at a speed greater than that of the plastic sheeting to puncture at least a portion of the moving plastic sheeting; maintaining the speed of the omnidirectional cutting means at a speed greater than the speed of the plastic sheeting such that the puncture is enlarged to a lineal cut, and thereafter removing plastic sheeting containing the lineal cut and removing the omnidirectional cutting means from the cutting area along the circular path.

2. The process of claim 1 wherein the omnidirectional cutting means is a waterjet cutter.

3. The process of claim 1 wherein the sheeting is polyethylene film.

4. The process of claim 3 wherein said arc cut is primarily round.

5. The process of claim 4 wherein the omnidirectional cutting means is a waterjet cutter.

6. The process of claim 3 wherein the polyethylene film has a folded edge and the edge cut by the omnidirectional cutting means is the folded edge.

7. The process of claim 6 wherein the cut forms a primarily round hole in the polyethylene film.

8. The process of claim 7 wherein the omnidirectional cutting means is a waterjet cutter.

9. The process of claim 6 wherein the omnidirectional cutting means is a waterjet cutter.

10. The process of claim 3 wherein the omnidirectional cutting means is a waterjet cutter.

11. The process of claim 1 wherein said arc cut is primarily round.

12. The process of claim 11 wherein the omnidirectional cutting means is a waterjet cutter.

13. The process of claim 1 wherein the plastic sheeting has a folded edge and the edge cut by the omnidirectional cutting means is the folded edge.

14. The process of claim 13 wherein the cut forms a primarily round hole in the plastic film.

15. The process of claim 14 wherein the omnidirectional cutting means is a waterjet cutter.

16. The process of claim 13 wherein the omnidirectional cutting means is a waterjet cutter.

17. The process of claim 1 wherein said arc cut is primarily round.

18. The process of claim 1 wherein the plastic sheeting has a folded edge and the edge cut by the omnidirectional cutting means is the folded edge.

19. The process of claim 18 wherein the omnidirectional cutting means is a waterjet cutter.

20. The process of claim 1 wherein the omnidirectional cutting means comprises a waterjet cutter having a waterjet assembly with a waterjet passage section wherein the waterjet assembly revolves along said circular path while the waterjet passage section rotates in the opposite direction such that the position of the waterjet passage section relative to the waterjet assembly does not change.

21. The process of claim 1 wherein the omnidirectional cutting means makes at least 2.5 full and complete cuts per second.

22. A process for making a repetitive arc cut in a continuous manner in a continuous supply of plastic sheeting possessing a folded edge which comprises passing a continuous supply of plastic sheeting across a cutting area and while therein a revolving waterjet cutter along a 360 degree circular path in an arc-defined motion through the cutting area across a folded edge of the plastic sheeting in the direction of movement of the plastic sheeting at a speed greater than that of the speed of the plastic sheeting to puncture at least a portion of the folded edge of the moving plastic sheeting; maintaining the revolution of the waterjet cutter at a speed greater than the speed of the plastic sheeting such that the puncture in the folded edge is enlarged to a lineal cut; and thereafter removing plastic sheeting containing the lineal cut and the waterjet cutter from the cutting area.

23. An apparatus for making a repetitive arc cut in a continuous manner in a continuous supply of plastic sheeting possessing edges, comprising means for receiving a moving plastic sheeting having edges in a cutting area thereof, means to follow along a 360 degree circular path for passing an arc-directed omnidirectional cutting means through the cutting area a portion of which passes through the cutting area to be occupied by an edge of the plastic sheeting and in the direction of movement of the plastic sheeting, at a speed greater than the speed of the plastic sheeting, means for puncturing the sheeting located in the cutting area and initiating the cutting with the omnidirectional cutting means of the plastic sheeting within the cutting area to form a cut portion, and means for withdrawing the cut portion of the plastic sheeting from the cutting area along the circular path.

24. The apparatus of claim 23 wherein the omnidirectional cutting means is a waterjet cutter.

25. The apparatus of claim 23 wherein the sheeting is polyethylene film.

26. The apparatus of claim 25 wherein the omnidirectional cutting means provides an arc cut which is primarily round.

27. The apparatus of claim 26 wherein the omnidirectional cutting means is a waterjet cutter.

28. The apparatus of claim 25 wherein the polyethylene film has a folded edge and the edge cut by the omnidirectional cutting means is the folded edge.

29. The apparatus of claim 28 wherein the cut forms a primarily round hole in the polyethylene film.

30. The apparatus of claim 29 wherein the omnidirectional cutting means is a waterjet cutter.

31. The apparatus of claim 28 wherein the omnidirectional cutting means is a waterjet cutter.

32. The apparatus of claim 25 wherein the omnidirectional cutting means is a waterjet cutter.

33. The apparatus of claim 23 wherein the omnidirectional cutting means provides an arc cut which is primarily round.

34. The apparatus of claim 24 wherein the omnidirectional cutting means provides an arc cut which is primarily round.

35. The apparatus of claim 34 wherein the omnidirectional cutting means is a waterjet cutter.

36. The apparatus of claim 34 wherein the plastic sheeting has a folded edge and the edge cut by the omnidirectional cutting means is the folded edge.

37. The apparatus of claim 23 wherein the plastic sheeting has a folded edge and the edge cut by the omnidirectional cutting means is the folded edge.

38. The apparatus of claim 37 wherein the cut forms a primarily round hole in the plastic film.

39. The apparatus of claim 38 wherein the omnidirectional cutting means is a waterjet cutter.

40. The apparatus of claim 37 wherein the omnidirectional cutting means is a waterjet cutter.

41. The apparatus of claim 23 wherein the omnidirectional cutting means comprises a waterjet cutting means having a waterjet assembly with a waterjet passage section provided with means to revolve the waterjet assembly along a circular path through the cutting area while rotating the waterjet passage section in the opposite direction such that the position of the waterjet passage section relative to the waterjet assembly does not change.

42. The process of claim 23 wherein the omnidirectional cutting means is provided with means such that it can make at least 2.5 full and complete cuts per second.

43. An apparatus for making a repetitive arc cut in a continuous manner in a continuous supply of plastic sheeting possessing a folded edge comprising:
(a) means for receiving a moving plastic sheeting having a folded edge in a cutting area thereof;
(b) revolution means for passing an arc-directed waterjet cutter along a 360 degree circular path through and from the cutting area, over the cutting area to be occupied by the folded edge of the plastic sheeting and in the direction of movement of the plastic sheeting, at a speed greater than the speed of the plastic sheeting;

(c) means for puncturing the folded edge of the plastic sheeting located in the cutting area and initiating the cutting with the waterjet cutter of the plastic sheeting within the cutting area to form a cut portion;

(d) means for withdrawing the cut portion of sheeting from the cutting area; and (e) means for collecting water issuing from the waterjet cutter.

* * * * *